United States Patent [19]

Lombard

[11] 4,352,243
[45] Oct. 5, 1982

[54] APPARATUS FOR CUTTING VEGETATION

[75] Inventor: Marco H. Lombard, Austin, Tex.

[73] Assignee: Emerson Electric Co., St. Louis, Mo.

[21] Appl. No.: 245,458

[22] Filed: Mar. 19, 1981

Related U.S. Application Data

[63] Continuation of Ser. No. 132,382, Mar. 21, 1980, abandoned.

[51] Int. Cl.³ ............................................ A01D 50/00
[52] U.S. Cl. ........................................ 30/276; 56/12.7
[58] Field of Search .................... 30/276, 347; 56/12.7

[56] References Cited

U.S. PATENT DOCUMENTS

| | | | |
|---|---|---|---|
| 3,708,967 | 1/1973 | Geist et al. | 56/12.7 |
| 3,826,068 | 7/1974 | Ballas et al. | 56/12.7 |
| 3,895,440 | 7/1975 | Pittinger | 30/347 |
| 4,035,915 | 7/1977 | Pittinger | 30/347 |
| 4,052,789 | 10/1977 | Ballas | 30/276 |
| 4,054,992 | 10/1977 | Ballas | 30/276 |
| 4,067,108 | 1/1978 | Ballas | 30/276 |
| 4,104,796 | 8/1978 | Sheldon | 30/276 |
| 4,104,797 | 8/1978 | Ballas | 30/276 |
| 4,236,312 | 12/1980 | Foster | 30/276 |
| 4,244,103 | 1/1981 | Sharr | 30/276 |
| 4,285,127 | 8/1981 | Zerrer | 30/276 |
| 4,290,200 | 9/1981 | Lombard | 30/276 |

Primary Examiner—Jimmy C. Peters
Attorney, Agent, or Firm—Hubbard, Thurman, Turner & Tucker

[57] ABSTRACT

Apparatus for cutting vegetation with a rotatable head carrying a non-metallic cutting line extended into a cutting plane. Additional line is extended from a supply line coil within the head into the cutting plane without independent operator action. A mechanism in the head automatically feeds replacement line whenever the free end of the cutting line is reduced to less than a predetermined maximum length in the cutting plane. The cutting line length is always extended to this predetermined maximum length at all operational rotational speeds, without adjustment, and in a positive step-by-step mode of segmental line advancement. The line feeder mechanism, has an escapement lever with a triggering toggle that also can be actuated at the operator command.

20 Claims, 6 Drawing Figures

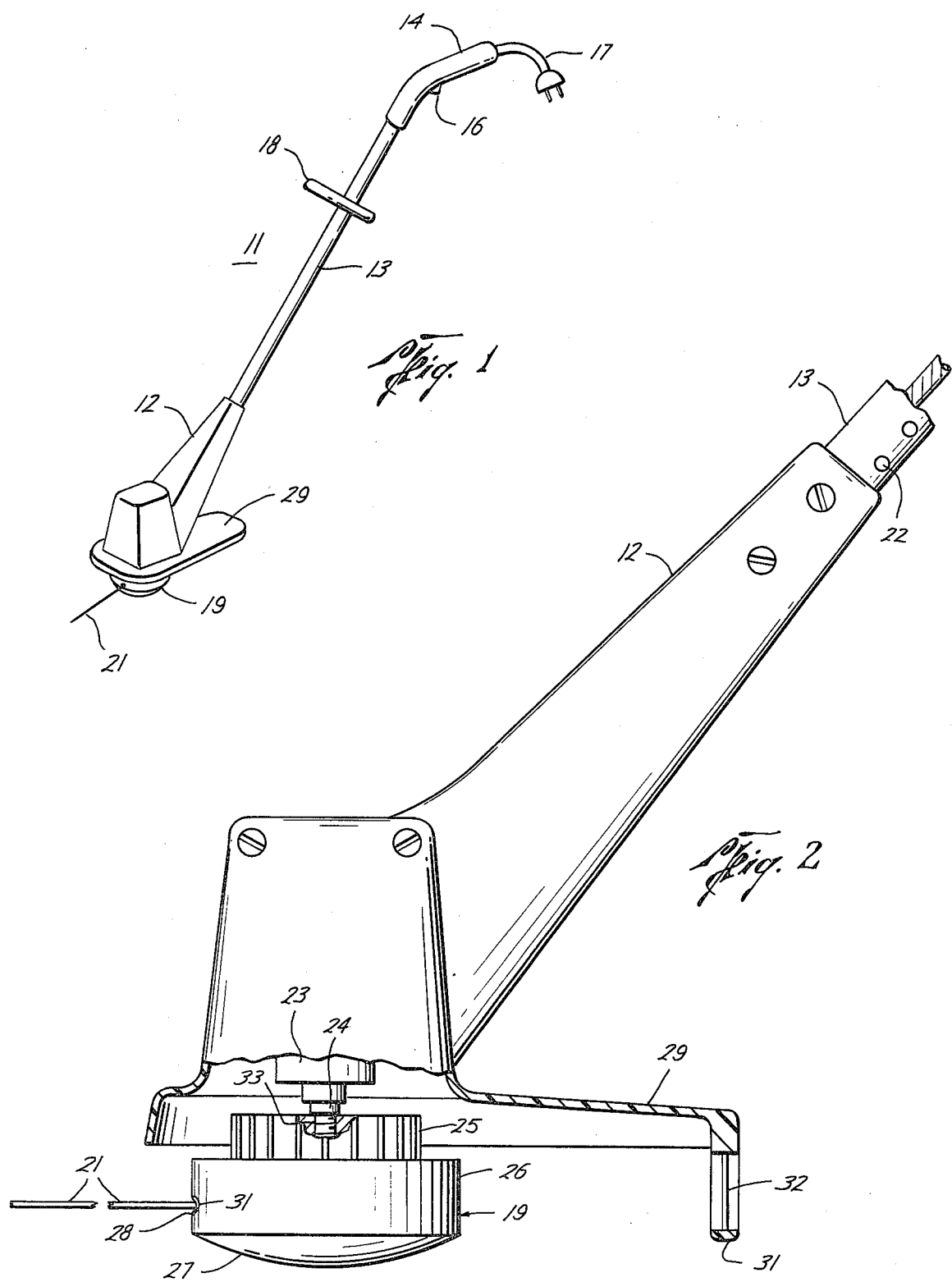

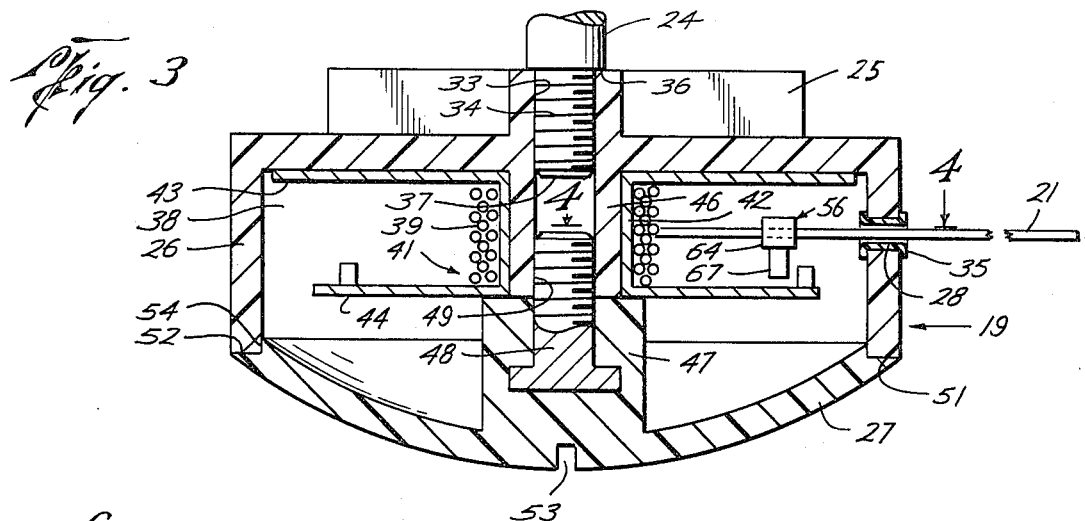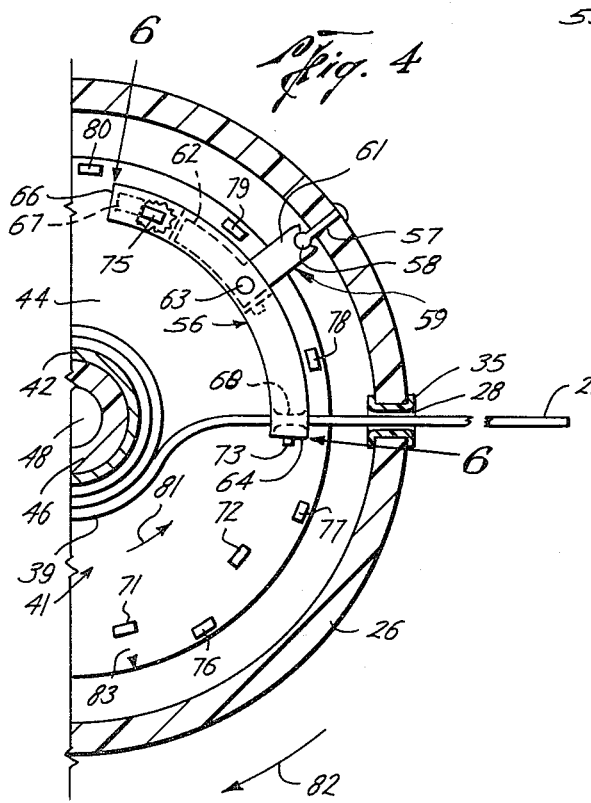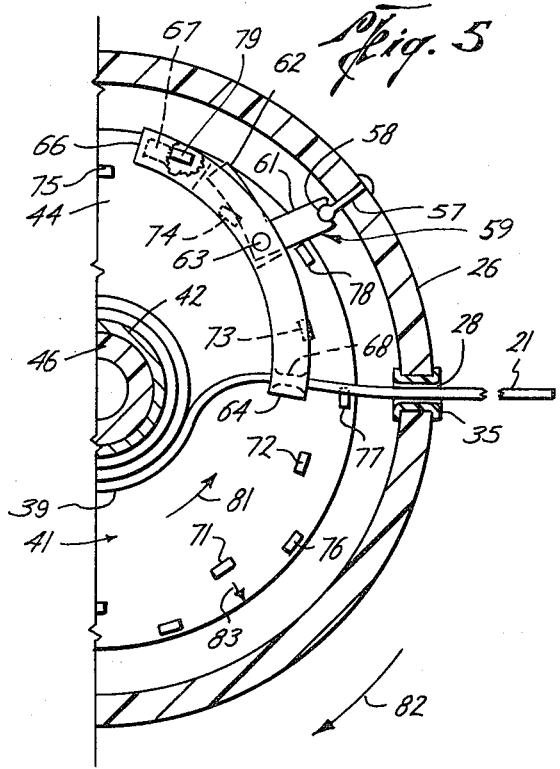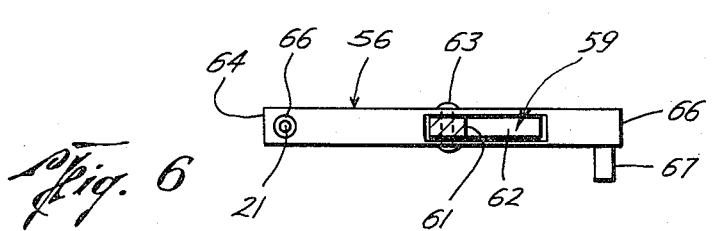

APPARATUS FOR CUTTING VEGETATION

This application is a continuation, of application Ser. No. 132,382, filed Mar. 21, 1980 now abandoned.

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In the United States of America, practical vegetation cutting devices using flexible, non-metallic lines carried upon a rotating head were developed. Examples of devices are shown in U.S. Pat. Nos. 3,708,967, 3,826,068, 4,052,789, 4,054,992, 4,067,108 and 4,104,797. These patented devices have met outstanding success in that these American developments provide safer electrical or gasoline-powered tools for vegetation cutting, edging and trimming operations.

The devices shown in these patents employ a flexible cutting line, such as manufactured from Nylon ® polymer. The cutting line is carried usually upon a spool internally of a rotating head. When desired to replenish the line or to extend an additional length of it, the rotation of the head was stopped and line manually extended from the spool. This line extension procedure in the patented devices has been found to be convenient, simple and reliable. In many of the more powerful devices, especially those powered by DC electric motors, a system to extend the cutting line from the head without interrupting cutting operations was desired.

A most desirable system would be capable of feeding cutting line as needed from the head so that line feeding is independent of operator action during grass cutting. Structures directed toward this purpose are shown in U.S. Pat. Nos. 3,895,440, 4,020,550 and 4,035,915. These structures have in common a basket-weave supply of cutting line carried on the periphery of a disc with the line feeding from behind special post members. These post members have a cutting-abrading edge so that cutting line from the weave supply is bent about such edge in the free traveling end portion extending into the cutting plane. The combination function of the edge, line, angular speed, etc., is arranged so that the line posts with such edge sever the free end of the cutting line when it is worn to an ineffective length. In practice, these structures are found to waste about 25 percent of the cutting line because of the excessive length of line severed at the post's edge, e.g., three inches.

The present invention provides a rotating head with a mechanism that maintains the cutting line at its maximum present length in the cutting plane irrespective of rates of cutting line wear or loss and without interrupting vegetation cutting or requiring independent operator action. However, the operator can selectively activate the mechanism if additional length of cutting line extensions are desired.

SUMMARY OF THE INVENTION

In accordance with this invention, there is provided an apparatus for cutting vegetation which has a head rotatable about an axis of rotation. The head may carry in a cavity a coiled supply of a flexible non-metallic cutting line. The cutting line extends outwardly from the head through an aperture into a cutting plane. An escapement lever in a first position secures the cutting line against extension from the head when its free end is at a predetermined maximum length. The escapement lever in a second position uncoils the cutting line for extending step-by-step the cutting line through the aperture into the cutting plane. A toggle pivot means shifts the escapement lever from the first position to the second position, during head rotation to extend the cutting line from the aperture whenever the cutting line is shortened to less than the predetermined maximum length. As a result, the cutting line in the cutting plane is maintained automatically at the predetermined maximum length during the cutting of vegetation.

DESCRIPTION OF THE DRAWINGS

FIG. 1 is a pictorial view illustrating one embodiment of the apparatus for cutting vegetation arranged according to the present invention;

FIG. 2 illustrates in enlargement the lower portion of the apparatus shown in FIG. 1;

FIG. 3 is a vertical-section, in enlargement, taken axially through the cutting head of the apparatus shown in FIG. 2;

FIG. 4 is a partial cross-section of the cutting head as shown in FIG. 3, taken along line 4—4;

FIG. 5 is a partial cross-section of the cutting head shown in FIG. 4, but showing the advancement of the spool by a given angular increment; and FIG. 6 is a partial elevation taken on line 6—6 in FIG. 4 illustrating the escapement lever used to control rotation of the spool carrying cutting line with the cutting head.

In these drawings, the several embodiments have common elements of construction in the cutting head. In regard to the several figures, like elements carry like numerals to simplify description of these embodiments in description of the present apparatus.

DESCRIPTION OF PREFERRED EMBODIMENTS

Referring to FIG. 1, there is shown an apparatus for cutting vegetation which is constructed in accordance with one embodiment of the present invention. In this particular embodiment, the apparatus is a grass trimmer 11, but it could be a lawnmower, edger or other device for vegetation cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a head 19 rotatable about an axis passing through the housing 12, and the cutting line 21 extends into a cutting plane which is substantially perpendicular to the axis of rotation of the head.

In FIG. 2 there is shown an enlargement of the housing 12 carrying a plurality of air induction openings 22 in the tube 13. These openings introduce a flow of cooling air over the motor contained in the housing 12. The housing 12 includes an electric motor 23 which has a downwardly-extending drive shaft 24. The head 19 is threadedly connected to the shaft 24. The upper surface of the head 19 may be surrounded by a plurality of vanes 25 serving as a centrifugal blower for moving air radially outwardly from the head 19 during its rotation. As a result, the induced flow of air cools the motor 23 within the housing 12. The head 19 includes a hub 26 and a cover 27. The hub 26 carries in its side peripheral surface an aperture 28 through which the cutting line 21 extends radially outwardly into the cutting plane. A metal bearing surface 35 may be placed at the aperture to protect the line 21 against undue wear and breakages. The cover 27 is releasably secured to the hub 26 by a threaded connection.

The housing 12 includes a rearwardly-extending tail part 29 which serves as a protection to the user to prevent inadvertent contact with the rotating cutting line 21. Also, the tail part provides an automatic limit to the excessive extension of the cutting line 21 from the head 19. More particulary, the tail part 29 has a downwardly-extending projection 31 in which is embedded a metal cutting blade 32. As a result, the cutting line 21, when rotated in a cutting plane by the head 19, can never have an operating length greater than the distance from the axis of rotation to the cutting blade 32. Any greater length of cutting line is automatically severed by the blade 32.

The head 19, as seen in FIGS. 3-5, is disc-like with a smooth peripheral side surface carrying the aperture 28 through which the cutting line 21 extends into the cutting plane. If more than one cutting line is used, each line should have a separate aperture and bearing surface. The hub 26 on one face carries integrally adapter threads 33 in which the drive shaft 24 is secured by its threads 34. In addition, the adapter threads 33 extends axially a sufficient dimension in the head 19 to form a rigid and integral connection with the shaft 24. Preferably, the shaft 24 is cylindrical with a flat circular shoulder 36 above its lower terminus 37.

The exposed external surfaces of the head 19 should be smooth in surface contour, rounded at the edges and without substantial projections and recesses capable of trapping appreciable vegetation. Preferably, the cover 27 has a smooth exposed surface, is circular in configuration with rounded corners, and is coaxially aligned with the axis of rotation of the head 19.

The hub 26 forms a cylindrical cavity 38 in cooperation with the cover 27. A supply 39 of coiled cutting line is disposed within the cavity 38. The coiled cutting line is free for uncoiling by independent rotational and axial movements within the head 19. Preferrably, the coiled cutting line is carried on a spool 41 mounted for rotation within the head.

The spool has a tubular body 42 with flanges 43 and 44 defining a space receiving the supply 39 of cutting line. The spool 41 is journaled for free rotation in the head 19 by its mounting upon post 46 and axially secured by a post 47 carried upon the hub 26 and cover 27, respectively.

The cover 27 carries integrally a stud 48 which is received within a threaded axial opening 49 on the hub 26. The hub and cover have meeting surfaces provided by posts 46 and 47, and annular abutting planar surfaces 51 and 52, respectively. An interior ridge 54 provides for alignment between the hub and cover. The cover is unthreaded for access to the cavity 38, preferably counter-directionally to head rotation to prevent unintended loosening. A screw driver slot 53 permits ready gripping of the cover for its threaded mounting on the hub 26.

The interior end of the coiled cutting line is secured to the spool 41. The free end of the cutting line 21 extends outwardly of the head 19 through the aperture 28. Preferably, the coiled cutting line supply 39 is wound codirectionally to the rotation of the head during vegetation cutting. This coiled line winding arrangement avoids backlash problems and unintended uncoiling of cutting line when rotation of the head is suddenly induced.

In accordance with this invention, a fully automatic mechanism is provided to uncoil the cutting line within the head, and to extend the cutting line through the aperture into the cutting plane when the cutting line is shortened to less than the predetermined length.

More particularly, the mechanism provides for the positive segmental line advance by a controlled rotation of the spool 41 relative to the head 19 during its rotation. An important feature of the mechanism is an escapement lever that provides a step-by-step rotation of the spool by sensing centrifugal force induced by head rotation and the force exerted upon the extended cutting line also induced by head rotation. Also, the escapement lever system uses these forces in a coact to provide a snap-action line advancement function by mounting the escapement lever upon a toggle pivot element.

In reference to FIGS. 4-6, an escapement lever mechanism is illustrated which provides the automatic but positive incremental extension, as needed, of the cutting line. The head 19 carries an escapement lever 56 in a pivot mounting which provides for movement between a first position (shown in FIG. 4) and a second position (shown in FIG. 5). Preferably, the lever 56 is mounted near mid length, and for this purpose, a metal stud 57 carrying a ball 58 can be mounted in the hub 26. The lever 56 is pivotally mounted upon the ball 58 for movement between the first and second positions.

A toggle element may provide the pivoted interconnection between the lever 56 and the ball 58. This element can be in the form of a lever cam 59 also has a second arm 62 to serve as a counter balance sensitive to centrifugal force. At the meeting of the arms 61 and 62, the cam 59 has an opening through which passes pin 63 secured in the lever 56.

The cam 59 is journaled not only to the ball 58 on the hub 26 but also by the pin 63 to the lever 56. This toggle pivot mounting has two important functions. First, the cam 59 can move between a radial inward position (see FIG. 4) and a radial outward position (see FIG. 5). Second, the lever 56 moves both angularly and radially between its first and second positions.

The lever 56 at one end 64 has a passageway 68 through which is threaded the cutting line between the spool 41 and the aperture 31. Centrifugal force acts upon the cutting line 21 and results in a first force acting upon the lever 56 to produce movement responsively in it, as will be explained hereinafter in greater detail.

The lever 56 at its other end 66 carries an anchor 67 which moves between a radial inward position (shown in FIG. 4) and a radial outward position (shown in FIG. 5) as the lever 56 moves between its first and second positions, respectively.

As mentioned, movement of the lever 56 controls step-by-step rotation of the spool 41 relative to the hub 26. For this purpose, the anchor 67 cooperates with escapement teeth carried on the spool 41.

Preferrably, the escapement teeth are carried on the flange 44 as a plurality of axially oriented teeth. These teeth can be disposed in a group with an inward or first radial position which includes teeth 71-75 and another group with an outward or second radial position which includes teeth 76-80. These teeth are selectively and positively engaged by the anchor 67 to produce a step-by-step rotation (as shown by the arrow 81) relative to the hub 26. The head rotates in the direction shown by the arrow 82. Of course, the elements in the head 19 could be reversed in function so the head 19 could rotate in the opposite direction to arrow 82 and yet function properly. The anchor 67 always engages a tooth in either the first or second radial positions.

As seen in FIG. 4, the lever 56 at its first position places the anchor 67 radially inward and it engages the tooth 75 of the radial inward group of teeth, as a result, the spool 41 is secured against rotation and the lever 56 is at this first position when the cutting line 21 is at its predetermined maximum extended length into the cutting path.

When the cutting line 21 is shortened to less than this predetermined maximum length sufficiently to activate the escapement mechanism, the lever 56 moves to the second position shown in FIG. 5. At this time, the spool 41 has advanced angularly to a position where the anchor 67 engages the tooth 79 in the radially outward group of teeth. Spool advancement can be readily seen by reference to the index arrow 83 position relative to the hub 26 between FIGS. 4 and 5. This spool advance is arranged to occur when the cutting line 21 is shortened to approximately one-half the cutting line advancement produced by this rotation of the spool 41.

When the cutting line 21 is again extended to its predetermined length, the lever 56 responds to return into its first position where the anchor 67 will engage the tooth 73 next approaching in the radial inward group of teeth. Another segment of cutting line is again extended from the head. Obviously, there has occurred a step-by-step angular advancement of the spool 41 to provide the remaining half of incremental segmental extension of the cutting line.

The escapement lever mechanism is arranged to provide this function. As mentioned, the lever 56 is mounted off center and the length from the pin 63 to the end 66 is greater than to the end 64. Also, the lever cam 59 is selected to respond in movement to the radial outward position from the magnitude of centrifugal force present when the head 19 rotates at angular velocities representing affects of the cutting line 21 shortened to less than the predetermined maximum extended length. In like manner, the first force produced by the cutting line acting at the end 64 of the lever 56 acts to move it from the first position to the second position when the cutting line is shortened to less than the predetermined maximum extended length. As a result, the centrifugal force acting on the lever cam 59 coacts with the first force applied to the end 64, and the lever 56 moves crisply or with a snap-action into the second position provided a stepwise angular advancement of the spool 41.

it is important to note as the cam 59 moves radially outwardly, the axial alignment between the ball 58 and the pin 63 is shifted a few degrees from the radius centered on the shaft 24. This shift effectively lengthens the lever 56 to its end 66 and accelerates movement into the second position.

When the cutting line 21 reaches its predetermined maximum extended length, the centrifugal force and first force again coact to return the lever 56 to its first position with the same snap-action movement. The snap-action movement is principally that of the toggle pivot provided by the lever cam 59 but reinforced by the force of the cutting line 21 acting at one end 64 of the lever 56.

Stated in another manner, the escapement lever mechanism can be described as being bistable in the first and second positions of the lever 56. However, the effects of the cam 59 and effects of the cutting line 21 at the end 64 prevent any stable position intermediate the first and second positions of the lever 56. Therefore, once the lever 56 begins to move, it travels from one position with a snap-action to the other position. In no event can the escapement mechanism allow the spool to free-wheel or ratchet in a runaway condition. The spool is always held by positive stop provided by the anchor 67 engaging the teeth carried by the spool 41.

The escapement mechanism can also be activated at operator selection by raising the head 19 free of the vegetation being cut. Then, the head is allowed to stop rotation. Now, the operator starts the motor 23 and the head 19 accelerates to its operational angular velocity. Should the cutting line be shortened to less then its predetermined maximum extended length, the acceleration effect on the lever 56 acts through the toggle pivot to ball 58, and the lever 56 moves into the second position for producing cutting line extension. As is apparent, the mass of the lever 56 is chosen to produce this desired result during the stated rate of acceleration in free air.

Although the head 19 can be manufactured in various forms and of several materials, it is preferred to manufacture the hub 26 and cover 27 of plastic material, e.g., Nylon 6 polymer. The spool 41 and cutting line can be made of a similar material. The lever 56, lever cam 59, ball 58, stud 57 and pin 63 can be made of a metal such as steel, aluminum or various metallic combinations.

Although there has been described a particular arrangement of functions and elements in the various mechanisms employed in the head of the present invention, it is not intended that this description be the only possible arrangement of these elements to produce the results of the invention. In this regard, the functions and elements may be altered to produce the same results. All that is required for these elements is a mechanism which secures the line 21 from extension when at the predetermined maximum extended length in the cutting plane. Also, a mechanism which releases the cutting line as needed when the cutting line has been reduced by wear or loss, to length less than the desired maximum length. In addition, the mechanism provides for the automatic extension of the cutting line with a few relatively simple and inexpensive escapement elements.

From the foregoing, it will be apparent that there has been provided a novel apparatus for cutting vegetation which provides a convenient and safe means for extending automatically cutting line without the individual attention of the operator. It will be appreciated that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:

1. An apparatus for cutting vegetation, comprising:
   (a) a head rotatable about an axis of rotation, said head having at least one peripheral aperture;
   (b) said head carrying a cavity providing a storage area for cutting line;
   (c) spool means mounted in said cavity and journaled therein for rotation about the rotational axis of said head and including a plurality of escapement teeth;
   (d) a supply of flexible non-metallic cutting line disposed in a coiled portion about said spool means with one end secured thereto and with a free end extending outwardly from said head through said aperture into a cutting plane; and
   (e) an escapement lever movably mounted on said head and including means forming a passageway through which a portion of said cutting line extends between said coiled portion and said free end, said escapement lever including an anchor for selectively engaging respective ones of said escapement teeth in moving between a first position and a second position to permit rotation of said spool means to extend incremental lengths of said cutting line into said cutting plane, said escapement lever being movable from said first position to said second position in response to said free end of said cutting line being shortened to less than a predetermined length; and
   (f) toggle pivot means including an element pivotally connected to said head and said escapement lever and supporting said escapement lever for movement between said first position and said second position to permit extension of incremental lengths of said cutting line into said cutting plane when said cutting line is shortened to less than a predetermined maximum length whereby said cutting line is extended in length during the cutting of vegetation.

2. The apparatus of claim 1, wherein said escapement lever supports said cutting line adjacent said aperture and senses variations in centrifugal force exerted upon said free end of said cutting line reflecting in the angular velocity of said head during rotation.

3. The apparatus of claim 2, wherein said cutting line acts on said escapement lever to provide a force upon said toggle pivot means to shift said escapement lever into the second position when said cutting line is shortened to less than the predetermined maximum length.

4. The apparatus of claim 3, wherein said toggle pivot means includes a lever cam actuated by centrifugal force for shifting said escapement lever into the second position.

5. The apparatus of claim 4, wherein said lever cam and said escapement lever act together in a snap action upon said toggle pivot means to shift positively said escapement lever into said second position.

6. The apparatus of claim 5, wherein said lever cam is pivoted about mid-length of said escapement lever to provide at least in part a certain balance between the centrifugal force of said cutting line acting upon one end of escapment lever and centrifugal force acting on said lever cam.

7. An apparatus for cutting vegetation, comprising:
   (a) a head rotatable about an axis of rotation and said head having at least one peripheral aperture;
   (b) said head carrying a cavity providing a storage area for cutting line;
   (c) spool means mounted in said cavity and journaled therein for rotation about the rotational axis of said head and carrying a plurality of angularly disposed escapement teeth;
   (d) a supply of flexible non-metallic cutting line disposed in a coiled portion about said spool means with one end secured thereto and with a free end extending outwardly from said head through said aperture into a cutting plane;
   (e) an escapement lever supported for movement on said head, said escapement lever carrying an anchor for selectively engaging said escapement teeth and in a first position securing said spool means against rotation in said head when said cutting line at said free end in said cutting plane has a predetermined maximum length;
   (f) said escapement lever in a second position stepping said anchor between said escapement teeth on said spool means to permit incremental rotation of said spool means for uncoiling said cutting line for extension from said head through said aperture into the cutting plane; and,
   (g) toggle pivot means including an element pivotally connected to said head and said escapement lever for shifting said escapement lever to said second position from said first position during head rotation whenever said cutting line is shortened to less than the predetermined maximum length, whereby said cutting line is extended in length during the cutting of vegetation.

8. The apparatus of claim 7, wherein said escapement lever supports said cutting line adjacent said aperture and senses variations in centrifugal force exerted upon said free end of said cutting line reflecting in the angular velocity of said head during rotation.

9. The apparatus of claim 8, wherein said cutting line acts on said escapement lever to provide a force upon said toggle pivot means to shift said escapement lever into the second position when said cutting line is shortened to less than the predetermined length.

10. The apparatus of claim 7, wherein said element includes a lever cam actuated by centrifugal force for shifting said escapement lever into the second position.

11. The apparatus of claim 9, wherein said lever cam and said escapement lever act together in a snap action upon said toggle pivot means to shift positively said escapement lever into said second position.

12. The apparatus of claim 9, wherein said lever cam is pivoted about mid-length of said escapement lever to provide at least in part a certain balance between the centrifugal force of said cutting line acting upon one end of escapement lever and centrifugal force acting on said lever cam.

13. An apparatus for cutting vegetation, comprising:
   (a) a head rotatable about an axis of rotation and said head having a peripheral aperture;
   (b) said head carrying an annular cavity to provide a storage area for a cutting line;
   (c) spool means mounted in said cavity and journaled therein for rotation about the rotational axis of said head;
   (d) a flexible non-metallic cutting line disposed in a coiled portion about said spool means with one end secured thereto and with a free end of said cutting line extending radially outwardly through said aperture into a cutting plane;
   (e) a semi-circular escapement lever carried by said head adjacent said aperture and being mounted pivotally about mid-length to toggle pivot means for radial and angular movement between first and second positions, said cutting line being threaded through one end of said escapement lever and said escapement lever carrying at its other end an anchor selectively engageable with a plurality of angularly disposed escapement teeth on said spool means for securing said spool means against rotation when said escapement lever is in said first position and controlling rotation of said spool means by step-by-step engagement of said teeth by said anchor when said escapement lever moves from said first position to said second position;

(f) said toggle pivot means shifting said escapement lever between said first position and said second position responsive to a first force applied by said cutting line to one end of said escapement lever, and said toggle pivot means including a lever cam actuated by centrifugal force to coact in moving said escapement lever between said first position and said second position; and (g) the first force acting on said escapement lever and the centrifugal force acting on said lever cam cofunctioning to secure said spool means against rotation in said head by moving with a snap action said escapement lever into said first position when said cutting line is at its predetermined length and to rotate controllably said spool means by moving with a snap action said escapement lever into said second position when said cutting line is shortened to less than its predetermined maximum length whereby cutting line is extended in length during the cutting of vegetation.

14. The apparatus of claim 13, wherein said escapement lever is journaled on said toggle pivot means for movement angularly from the first position to the second position when said head is accelerated in rotation between non-rotation and operation in cutting vegetation.

15. The apparatus of claim 13, wherein said escapement teeth are disposed in groups on said spool at first and second radial positions with one group engaged by said anchor at its inward position and the other teeth engaged by said anchor at its outward position.

16. An apparatus for cutting vegetation, comprising:
(a) a head rotatable about an axis of rotation and said head having a peripheral aperture;
(b) said head carrying an annular cavity to provide a storage area for a cutting line;
(c) spool means mounted in said cavity and journaled therein for rotation about the rotational axis of said head and carrying a plurality of angularly disposed escapement teeth in groups at a first radial position and a second radial position,
(d) a flexible non-metallic cutting line disposed in a coiled portion about said spool means with one end secured thereto and with a free end of said cutting line extending radially outwardly through said aperture into a cutting plane;
(e) a semicircular escapement lever carried internally by said head adjacent said aperture, and said cutting line threaded through passageway through one end of said escapement lever in a portion of said cutting line extending from said spool to said aperture whereby centrifugal force extended upon said cutting line is applied as a first force to said escapement lever, and the other end of said escapement lever carries an anchor;

(f) toggle pivot means pivotally mounting said escapement lever about its mid-length to said head and providing for shifting said escapement lever between first and second positions;
(g) said toggle pivot means including a lever cam actuated by centrifugal force to coact in moving said escapement lever between the first and second positions;
(h) said toggle pivot means in moving said escapement lever between the first and second positions simultaneously moving said anchor thereon between an inward radial position and an outward radial position;

said anchor on said escapement lever in the first position selectively engaging said escapement teeth of the first group at the inward radial position to secure said spool means against rotation in said head, and said anchor selectively engaging said escapement teeth of the second group at the outward radial position to permit controlled step-by-step rotation of said spool means in said head for extending a length of cutting line from said aperture into the cutting path during head rotation; and (j) said cam lever pivoted to said escapement lever about its mid-length so that centrifugal force thereon moves said escapement lever whereby the first force acting on said escapement lever and the centrifugal force acting on said lever cam cofunction to secure said spool means against rotation by moving with a snap action said escapement lever into the first position when said cutting line is at its predetermined length and to permit controlled step-by-step rotation of said spool means by moving said escapement lever with a snap action into the second position when said cutting line is shortened to less than its predetermined maximum length during the cutting of vegetation.

17. An apparatus for cutting vegetation, comprising:
(a) a head rotatable about an axis of rotation and said head having at least one peripheral aperture;
(b) said head carrying a cavity providing a storage area for cutting line;
(c) spool means mounted in said cavity and journaled therein for rotation about the rotational axis of said head and carry a plurality of angularly disposed escapement teeth;
(d) a supply of flexible non-metallic cutting line disposed in a coiled portion about said spool means with one end secured thereto and with a free end extending outwardly from said head through said aperture into a cutting plane;
(e) an escapement lever carrying an anchor for selectively engaging said escapement teeth and in a first position securing said spool means against rotation in said head when said cutting line at said free end in said cutting plane has a predetermined maximum length;
(f) said escapement lever in a second position stepping said anchor between said escapement teeth on said spool means to permit incremental rotation of said spool means for uncoiling said cutting line for extension from said head through said aperture into the cutting plane; and,
(g) toggle pivot means including a lever cam mounted on said head and connected to said escapement lever, said lever cam being actuated by centrifugal force for shifting said escapement lever to said second position from said first position during head rotation whenever said cutting line is shortened to less than the predetermined maximum length, whereby said cutting line is extended in length during the cutting of vegetation.

18. An apparatus for cutting vegetation, comprising:
(a) a head rotatable about an axis of rotation, said head having at least one peripheral aperture;
(b) said head carrying a cavity providing a storage area for cutting line;
(c) spool means mounted in said cavity and journaled therein for rotation about the rotational axis of said head and including a plurality of spaced apart escapement teeth;
(d) a supply of flexible non-metallic cutting line disposed in a coiled portion about said spool means with one end secured thereto and with a free end extending outwardly from said head through said aperture into a cutting plane; and
(e) an escapement lever movably mounted on said head and including means forming a passageway through which a portion of said cutting line extends between said coiled portion and said free end, said escapement lever including an anchor for selectively engaging respective ones of said escapement teeth in moving between a first position and a second position to permit rotation of said spool means to extend positive segmental lengths of said cutting line into said cutting plane, said escapement lever being movable from said first position to said second position in response to said free end of said cutting line being shortened to less than a predetermined length, and said escapement lever being urged to return to said first position under a force exerted on said escapement lever by the portion of said cutting line extending through said passageway whereby said cutting line is extended in length during the cutting of vegetation.

19. An apparatus for cutting vegetation, comprising:
(a) a head rotatable about an axis of rotation, said head having at least one peripheral aperture;
(b) said head carrying a cavity providing a storage area for cutting line;
(c) a supply of flexible non-metallic cutting line disposed in said cavity and having a free end extending outwardly from said head through said aperture into a cutting plane;
(d) an escapement lever movably mounted on said head and including means forming a passageway through which a portion of said cutting line extends between said coiled portion and said free end, said escapement lever being movable between a first position and a second position to permit the extension of predetermined positive segmental lengths of said cutting line into said cutting plane; and
(e) toggle pivot means including an element pivotally connected to said head and said escapement lever and supporting said escapement lever for movement between said first position and said second position to permit extension of said predetermined positive segmental lengths of said cutting line into said cutting plane when said cutting line is shortened to less than a predetermined maximum length whereby said cutting line is extended in length during the cutting of vegetation.

20. An apparatus for cutting vegetation, comprising:
(a) a head rotatable about an axis of rotation, said head including a generally cylindrical hub having a hollow interior providing a cavity, and at least one peripheral aperture formed in a sidewall of said hub;
(b) a supply of flexible non-metallic cutting line disposed on spool means disposed in said cavity, said cutting line having a free end extending outwardly from said head through said aperture into a cutting plane;
(c) an escapement lever pivotally connected to said hub and including means forming a passageway through which a portion of said cutting line extends between a coiled portion and said free end, said escapement lever being cooperable with said spool means in moving between a first position and a second position to permit rotation of said spool means with respect to said hub to extend predetermined positive segmental lengths of said cutting line into said cutting plane when said cutting line is shortened to less than a predetermined maximum length during rotation of said head whereby said cutting line is extended in length during the cutting of vegetation.

* * * * *